US008872407B2

(12) United States Patent
Nelson et al.

(10) Patent No.: US 8,872,407 B2
(45) Date of Patent: Oct. 28, 2014

(54) ELECTRIC MOTOR ARRANGEMENT WITH IMPROVED BRUSH AND SPRING ELEMENTS

(75) Inventors: Benjamin Kloepfer Nelson, Dettelbach (DE); Andreas Weisensee, Würzburg (DE)

(73) Assignee: Brose Fahzeugteile GmbH & Co. KG, Würzburg, Würzburg (DE)

( * ) Notice: Subject to any disclaimer, the term of this patent is extended or adjusted under 35 U.S.C. 154(b) by 388 days.

(21) Appl. No.: 13/315,313

(22) Filed: Dec. 9, 2011

(65) Prior Publication Data

US 2012/0146449 A1 Jun. 14, 2012

(30) Foreign Application Priority Data

Dec. 13, 2010 (DE) ........................ 10 2010 062 935

(51) Int. Cl.
*H02K 5/14* (2006.01)
*H01R 39/38* (2006.01)

(52) U.S. Cl.
CPC .................................... *H01R 39/381* (2013.01)
USPC ............................ 310/239; 310/240; 310/242

(58) Field of Classification Search
CPC ......... H02K 5/14; H02K 5/143; H02K 5/145; H02K 5/146; H02K 5/148
See application file for complete search history.

(56) References Cited

U.S. PATENT DOCUMENTS

| | | | | |
|---|---|---|---|---|
| 4,559,465 A * | 12/1985 | Gagneux | ........................ | 310/242 |
| 5,043,619 A * | 8/1991 | Kartman, Jr. | ................. | 310/242 |
| 5,281,876 A * | 1/1994 | Sato | ........................ | 310/40 MM |

FOREIGN PATENT DOCUMENTS

| | | | |
|---|---|---|---|
| DE | 202010007213 U1 * | 8/2010 | ........... H01R 39/415 |
| DE | 202010007213 U1 | 9/2010 | |

OTHER PUBLICATIONS

Machine translation of DE 202010007213 U1 (published Aug. 2010, translated Oct. 2013).*

* cited by examiner

*Primary Examiner* — Michael Andrews
(74) *Attorney, Agent, or Firm* — Manelli Selter PLLC; Edward J. Stemberger

(57) ABSTRACT

An electric motor arrangement, comprising a brush holder housing which has a plurality of brush elements which are coupled with a respective spring element, the spring element being configured to press the respectively associated brush element against a commutator of the electric motor arrangement, and the spring element having a first portion with a barbed hook for hooking or catching into a recess in the brush holder housing.

11 Claims, 4 Drawing Sheets

Detail A

ELECTRIC MOTOR ARRANGEMENT WITH IMPROVED BRUSH AND SPRING ELEMENTS

CROSS-REFERENCE TO RELATED APPLICATIONS

This application claims the benefit of German Patent Application No. 102010062935.9, filed Dec. 13, 2010, the entire disclosure of which is herein incorporated by reference.

FIELD OF THE INVENTION

The present invention relates to an electric motor arrangement, in particular to an electric motor arrangement with brushes.

BACKGROUND OF THE INVENTION

The present invention and the problem on which it is based are described in respect of an electric motor arrangement, in particular in respect of an electric motor arrangement with brush elements which are pressed against a commutator of the electric motor arrangement by associated spring elements.

In brush-equipped electric motors, there are different ways of pressing the carbon brush against the commutator to ensure the electrical contact. In most cases, the carbon brush is guided by holders inside a function carrier, such as a brush system, and the necessary contact force is generated by springs. Various types of springs and attachment methods are known. In this respect, the most current solution is to arrange a torsion spring with a leg at a right angle to the brush holder. However, a disadvantage of this solution is that an arbor has to be provided for the spring. This means that the arbor also needs space in the brush system at the side next to the brush holder.

In DE 20 2010 007 213 U1, a brush rocker for a commutator motor is described which comprises at least one carbon brush which is arranged in a brush guide and can be pretensioned by a torsion spring in the direction of the end face to be positioned on the commutator. The torsion spring is arranged along a plane extending vertically to the carbon brush.

BRIEF SUMMARY OF THE INVENTION

Against this background, the object of the present invention is to provide an improved electric motor arrangement.

An electric motor arrangement is provided, comprising a brush holder housing which has a plurality of brush elements which are coupled with a respective spring element, the spring element being configured to press the respectively associated brush element against a commutator of the electric motor arrangement, and the spring element having a first portion with a barbed hook for hooking or catching into a seat in the brush holder housing.

The idea on which the invention is based is to provide a brush spring or a spring element which on the one hand performs the basic function. i.e. to ensure the subsequent forwarding motion of the carbon or brush element, and on the other hand can be attached in a space-saving manner in a brush holder housing without an arbor.

The electric motor arrangement according to the invention makes it possible for the spring element to be attached with its barbed hook in the brush holder housing in a very simple and economical manner, without, for example an additional arbor or clips having to be configured on the brush holder housing to attach the spring element.

Advantageous configurations and developments are provided in the further subclaims and in the description with reference to the figures of the drawings.

In a embodiment, the seat in the brush holder housing is configured as an opening with a first opening portion, in particular a slot, and a second opening portion, it being possible for the barbed hook to be hooked or caught in the second opening portion and the first opening portion and the second opening portion forming in particular an undercut. An opening of this type has the advantage that it can be formed very easily in the brush holder housing. For this purpose, for example only a first opening can be configured as a slot in the brush holder housing as the first opening portion, which first opening leads into an opening or recess which is already present in the brush holder housing. The opening or recess which is for example already present can then be used as the second opening portion of the opening in which the barbed hook can be received or hooked or caught.

In a further embodiment according to the invention, the diameter of the first opening portion can be the same as or smaller than the diameter of the barbed hook of the spring element. If the diameter of the first opening portion is smaller, the barbed hook is compressed when guided through the first opening portion and can then spring apart again in the second opening portion and can hook or catch therein.

According to a further embodiment according to the invention, the first end of the spring element has a second portion which is accommodated in a recess in the brush holder housing, the recess being configured to secure the spring element in the radial direction of the brush holder housing. The width of the recess is, for example, the same as, or is substantially the same as the thickness of the second portion of the spring element, so that the spring element cannot inadvertently move in the radial direction or can only move within a predetermined tolerance range, predetermined by the width of the recess.

In another embodiment according to the invention, the brush holder housing has a snap-in hook. The snap-in hook can be configured such that it secures the spring element in the axial direction in the spring seat. This can ensure that the spring element cannot inadvertently move completely out of the spring seat in the brush holder housing.

The above configurations and developments can be combined together in any manner, if it makes sense to do so. Further possible configurations, developments and implementations of the invention also include combinations, not explicitly mentioned, of features of the invention which have been previously described or will be described in the following with regard to the embodiments. In particular, a person skilled in the art will also add individual aspects as improvements or supplements to the respective basic form of the present invention.

BRIEF DESCRIPTION OF THE SEVERAL VIEWS OF THE DRAWINGS

In the following, the present invention will be described in more detail with reference to the embodiments provided in the schematic figures of the drawings, in which.

Figure 1:
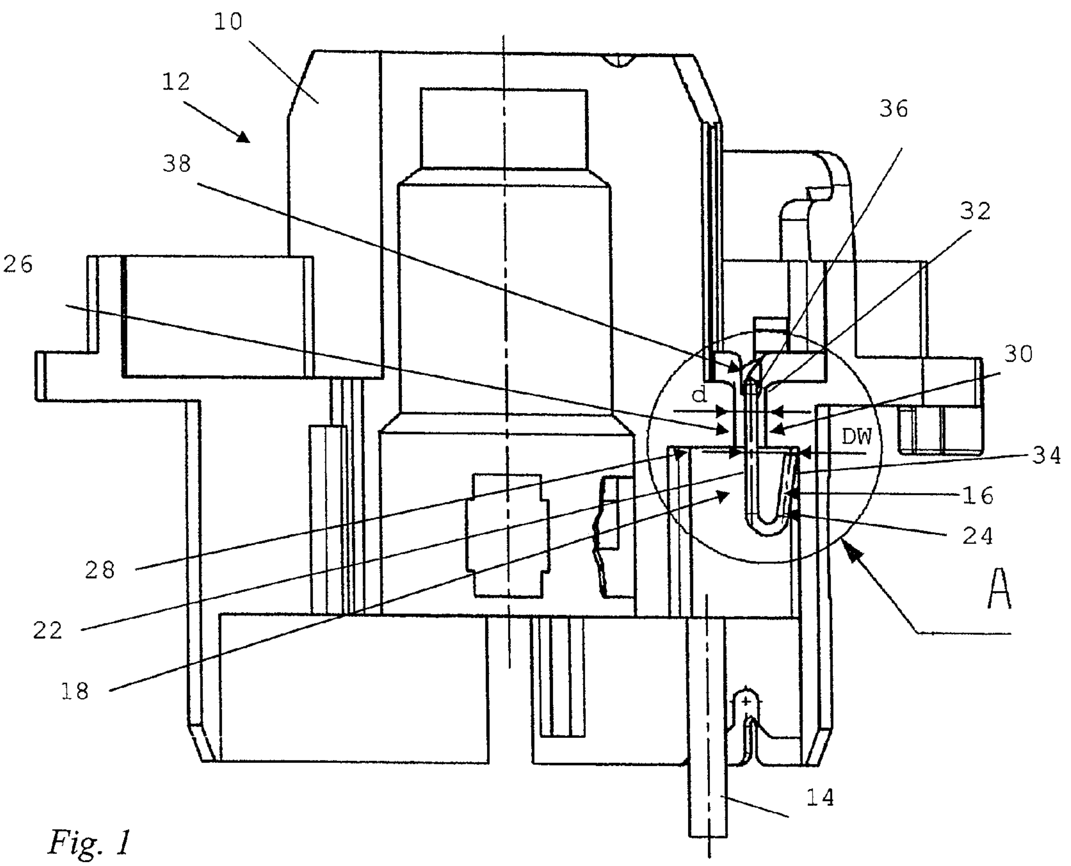
FIG. 1 is a sectional view of a brush holder housing of an electric motor according to the invention.

The accompanying drawings are intended to provide a further understanding of the embodiments of the invention. They illustrate embodiments and, together with the description, serve to explain principles and concepts of the invention. Other embodiments and many of the mentioned advantages become apparent in view of the drawings. The elements of the drawings have not necessarily been shown true to scale relative to one another.

In the figures of the drawings, identical, functionally identical and identically acting elements, features and components have been provided in each case with the same reference numerals, unless indicated otherwise.

DETAILED DESCRIPTION OF THE INVENTION

FIG. 1 is a sectional view of a brush holder housing 10 of an electric motor arrangement 12 according to an embodiment of the present invention.

An electric motor usually comprises a stator and a rotor. In the case of a d.c. motor or commutator motor, the stator has a permanent magnet with pole shoes. Provided inside the stator is the rotor which usually consists of a coil with an iron core, the so-called armature. The armature is mounted rotatably in the magnetic field between the pole shoes of the stator. The current for the armature is supplied via a commutator or a segmented commutator and via sliding contacts. In this respect, brush elements or carbon brushes are used as sliding contacts.

As explained in more detail in the following in FIGS. 1 to 9 with reference to an embodiment of the invention, the basic principle of the invention is to provide a brush spring or a spring element which performs the basic function, the subsequent forwarding motion of the carbon or of the brush element, and on the other hand can perferably be attached in a brush holder housing without an arbor in a space-saving manner. In this respect, a limb of the spring element, such as a torsion spring, is configured as a barbed hook for hooking or catching into the brush holder housing. After this limb or leg has been pushed through a corresponding opening in the brush holder housing, the hook snaps outwards, as a result of which the spring element is restricted, in particular is greatly restricted, in the direction of movement along the axis. The complete fixing of the spring element can optionally be ensured by an additional snap-in hook. Such a snap-in hook is shown in particular in the following FIG. 3.

As shown in FIG. 1, provided in the brush holder housing 10 are the brush elements 14 which are pressed against the commutator (not shown) of the electric motor by spring elements 16 or brush springs.

As further shown in FIG. 1, the spring element 16 is used to press the respective brush element 14 against the commutator. The spring element 16 has for example a first end 18 and a second end 20, the spring element 16 being attached in the housing 10 by the first end 18 and pressing an associated brush element 14 against the commutator (not shown) by the second end 20.

The first end 18 of the spring element 16 has a first portion 22 with a snap-in hook or a barbed hook 24. The spring element 16 with its barbed hook 24 is hooked or caught in a seat 26 in the brush holder housing 10 to attach the spring element 16 to the brush holder housing 10.

For this, the seat 26 in the brush holder housing 10 has an undercut 28 in order to hook or snap-in the barbed hook 24. The seat 26 is configured as an opening 30 or recess, with a first opening portion 32 and a second opening portion 34, the first opening portion 32, in this case a slot, having a smaller diameter than the second opening portion 34. As shown in FIG. 1, the first and second opening portions 32, 34 form the undercut 28, on which the barbed hook 24 can be hooked or caught.

As can be seen from FIG. 1, the seat 26 or opening is arranged in the axial direction or substantially in the axial direction, so that the spring element 16 can be secured in the axial direction by hooking or catching its barbed hook 24 into the opening 30 in the brush holder housing 10. Thus, the barbed hook 24 of the spring element 16 is introduced into the opening 30 and hooked or caught in the second opening portion 34.

The first opening portion 32 can also be configured such that when the hooked barb 24 is introduced into and guided through the first opening portion 32, it is also compressed. Upon reaching the second opening portion, the barbed hook 24 can then spring apart again and can be hooked or caught in the second opening portion 34 or in the region of the undercut 28. As shown in FIG. 1, the first opening portion 32 or the slot can be provided for this purpose with a diameter d which is smaller than the diameter Dw of the barbed hook 24 and is smaller than the diameter D of the second opening portion 34.

Furthermore, as shown in FIG. 1, the first end 18 of the spring element 16 can have a second portion 36 which can be accommodated in a recess 38 for example in the form of a groove, in the brush holder housing 10, to additionally secure the spring element 16 in the radial direction. The recess 38 has two side walls which restrict the movement of the second portion 36 of the spring element 16 in the radial direction. To additionally secure the spring element 16 in the radial direction, the recess 38 has a width b which is for example slightly greater than, as shown in the embodiment, for example in FIGS. 1 and 2, or is the same as or substantially the same as the thickness dF of the second portion 36 of the spring element 16. Consequently, the spring element 16 with its second portion 36 in the recess 38 in FIG. 1 cannot move inadvertently in the radial direction or can only move within a predetermined region. The region within which the second portion 36 of the spring element 16 can move in the radial direction is determined by the width b of the recess 38. In the embodiment shown in FIG. 1, the side walls of the recess 38 are straight and are arranged in the axial direction.

The spring element 16 is configured such that its first end 18 is fitted with the second portion 36 in the recess 38 and it is then hooked or caught with its first portion 22 with the barbed hook 24 in the opening 30 in the brush holder housing 10. The recess 38 for the second portion 36 of the spring element 16 is also provided, for example, in the axial direction or substantially in the axial direction in the brush holder housing 10.

As shown in particular in the following FIGS. 1 to 9, the spring element 16 is for example a torsion spring, said torsion spring 16 having a wound or twisted portion 40, as well as the two first and second ends 18, 20 which are also called legs of the torsion spring. As previously described, the spring element 16, in this case the torsion spring, hooks or catches with the first end 18 on the brush holder housing 10, so that the spring element 16 cannot inadvertently move out of a seat in the brush holder housing 10 in the axial direction, without the barbed hook 24 firstly having to be removed from the opening 30.

Figure 2:
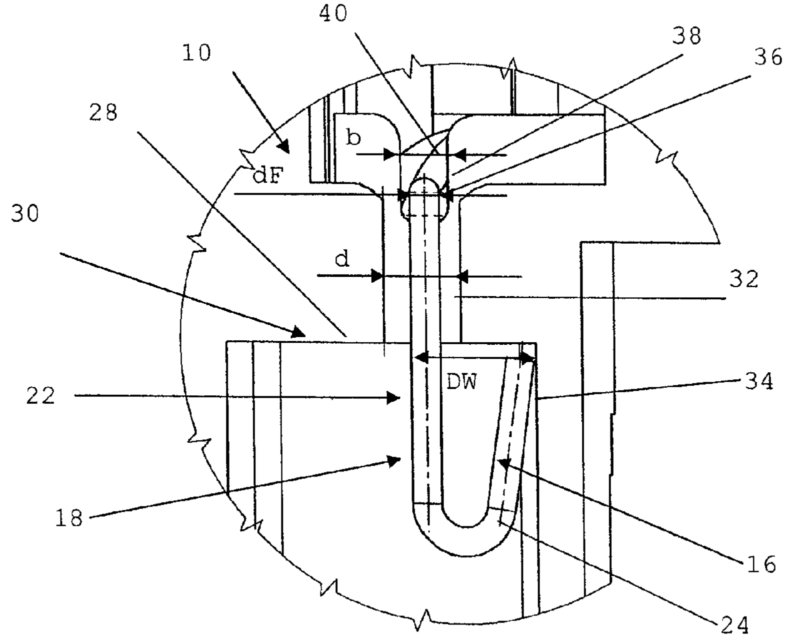
FIG. 2 shows a detail A of the brush holder housing and of a brush spring according to FIG. 1.

FIG. 2 shows a detail A of the brush holder housing 10 and of a brush spring or a spring element 16 according to FIG. 1. More precisely, FIG. 2 shows the first portion 22 of the spring element 16, here the torsion spring, with its barbed hook 24. The barbed hook 24 is introduced through the first opening portion 32 into the second opening portion 34 of the opening 30 and is hooked or caught therein. Furthermore, the second portion 36 of the first end 18 is accommodated in the recess 38 in the brush holder housing 10. As shown in FIG. 2, the width b of the recess 38 is for example selected to be slightly larger than the thickness dF of the second portion 36 of the spring element 16. Furthermore, the diameter d of the first opening portion 32 is for example smaller than the diameter dW of the barbed hook 24, so that when the barbed hook is guided through the first opening portion 32, it is compressed and it can then move or spring apart again in the second opening portion 34.

Figure 3:
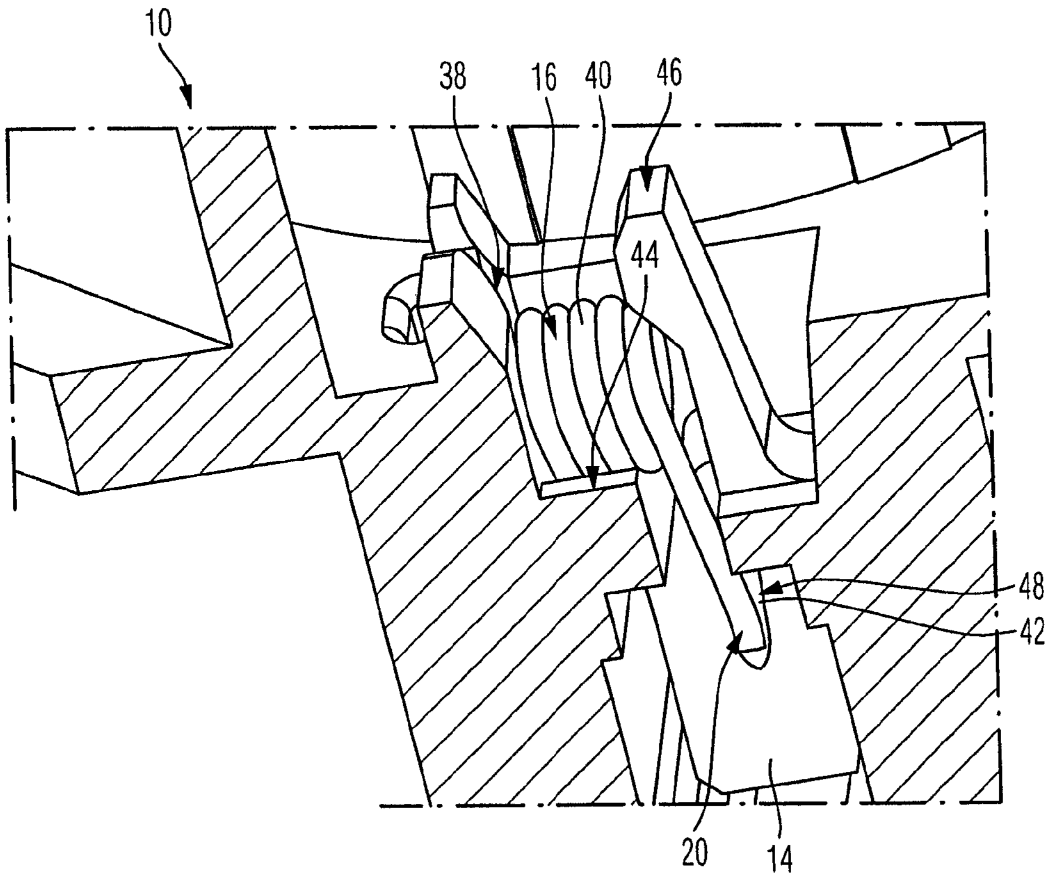
FIG. 3 is a perspective view of a detail of the brush holder housing according to FIG. 1.

FIG. 3 is a perspective view of a detail of the brush holder housing 10, the spring element 16 and its associated brush element 14. As can be inferred from FIG. 3, the spring element 16 has, in addition to the first end 18, a second end 20 which is coupled or can be coupled with the brush element 14 in order to press it against the commutator of the electric motor. As shown in the embodiment in FIG. 3, the brush element 14 has on its outer side a seat 42, for example, in the form of a recess, in which the second end 20 of the spring element 16 is accommodated. The outer side is bevelled or is configured with a bevel 48.

A torsion spring is preferably used as the spring element 16, as shown in FIG. 3. The wound portion 40 of the torsion spring 16 is accommodated in a spring seat 44 in the form of a recess in the brush holder housing 10. The recess has two side walls in the longitudinal direction of the wound portion 40 and a front side wall in which the recess 38 is accommodated for receiving the second portion 36 of the first end 18 of the spring element 16 in order to additionally secure the spring element 16 in the radial direction.

The wound portion 40 of the spring element is accommodated or laterally accommodated between the side walls. The base of the recess can be straight, that is to say planar, or domed corresponding to the wound portion 40 of the torsion spring, as shown in the embodiment in FIG. 3. The side walls in the embodiment in FIG. 3 are for example straight, i.e. they do not have an undercut.

The seat 44, for example the recess shown in FIG. 3, supports the spring element or in the present case the torsion spring 16 in the axial direction in the direction of the brush element and supports the spring element laterally such that the spring element 16 cannot move inadvertently in particular in the axial direction relative to the brush element 14. The spring element 16 can be positioned in the brush holder housing 10 in particular in the axial direction relative to the associated brush element 14 by the spring seat 44. For this, the spring element or here the torsion spring 16 can be introduced into the spring seat 44 and can be caught by its first end 18 in the opening 30 in the housing 10 and coupled by the other end 20 with the brush element 14. The barbed hook of the spring element 16 which is caught or hooked into the brush holder housing also secures the spring element 16 in the axial direction, so that the spring element 16 cannot inadvertently slip out of the spring element seat 44.

In this respect, a snap-in hook 46 can optionally also be provided on the brush holder housing 10 and, after the spring element 16 has been introduced into the seat 44, the snap-in hook 46 also secures said spring element 16 from above or from the opposite side such that the spring element 16 cannot inadvertently move out of the spring seat 44 or recess in the brush holder housing 10 particularly in the axial direction. In the embodiment shown in FIG. 3, the snap-in hook 46 is arranged on the back of the wound portion 40 or opposite the front side wall of the spring seat 44 with the recess 38. In this respect, the snap-in hook 46 can have an undercut or a projecting portion, into which or under which the spring element 16 can be hooked by its wound portion 40. In other words, the snap-in hook 46 stands with its projecting portion over part of the wound portion 40 of the spring element 16 when the spring element 16 is accommodated in the spring seat 44 and also secures the spring element 16 upwards in the axial direction.

Figure 4:
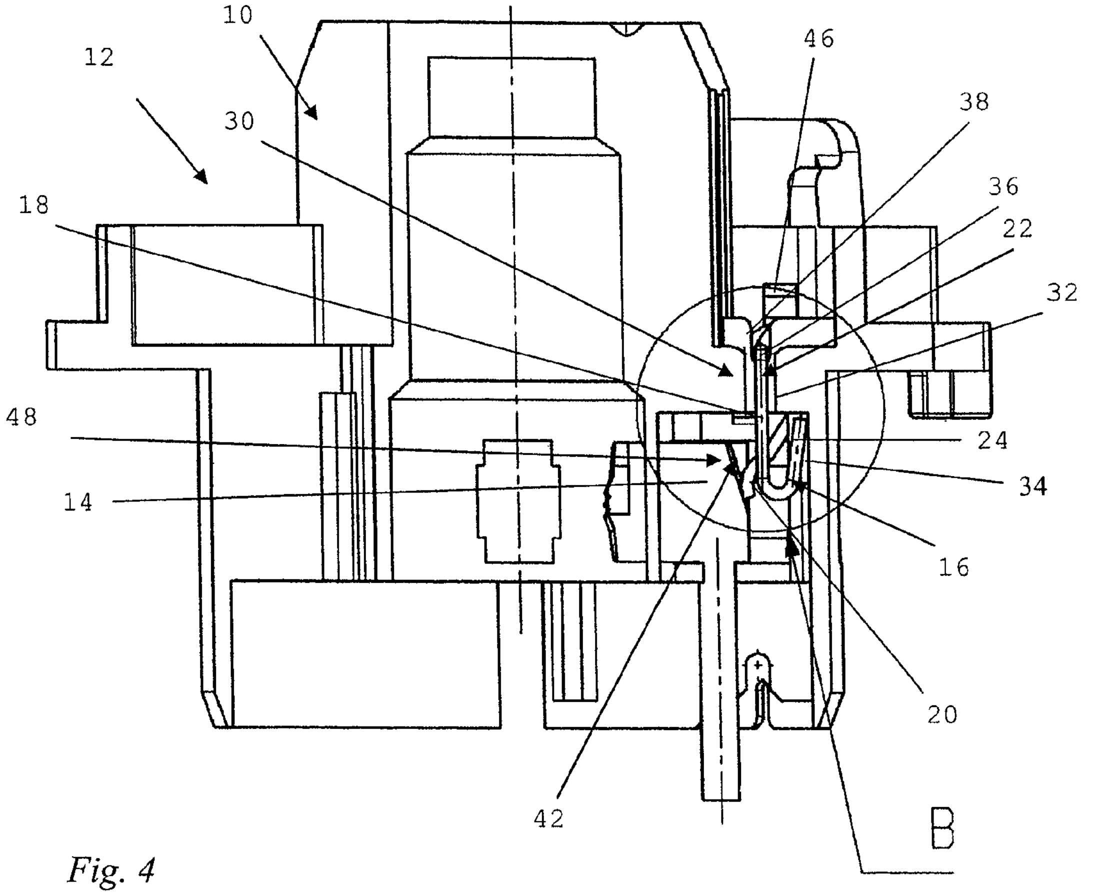
FIG. 4 is a sectional view of the brush holder housing according to FIG. 1 with a detail which shows a connection of the brush spring to a brush of the electric motor.

FIG. 4 is a sectional view of the brush holder housing 10 according to FIG. 1 with a detail which illustrates a connection of the brush spring or spring element 16 to a brush element 14 of the electric motor.

First of all, FIG. 4 shows the opening 30 in the brush holder housing 10 which has the first and second opening portions 32, 34. The barbed hook 24 of the first end 18 of the spring element 16 has been hooked or caught in the opening 30 or in the second opening portion 34 thereof, in order to counteract an inadvertent axial movement of the spring element 16, here a torsion spring.

Furthermore, the recess 38 in the brush holder housing 10 is shown in which the second portion 36 of the first end 18 of the spring element 16 is also secured in the radial direction. The additional snap-in hook 46 is also shown which also secures the spring element, that is to say the torsion spring 16, in the axial direction.

The connection of the second end 20 of the spring element 16 to the associated brush element 14 in the brush holder housing 10 is also illustrated in a partial section in FIG. 4. The second end 20 of the spring element 16 is accommodated on the outer side of the brush element 14 in a seat 42 in the form of a recess and is pre-tensioned for example against the brush element 14, so that it presses (downwards in FIG. 4) the brush element 14 in a predetermined direction, in the present case in the direction of the commutator (not shown). The recess 42 in the outer side of the brush element 14 is configured for example as a bevel 48 or is bevelled, said bevel 48, as shown in the following FIG. 5, having an angle $\alpha$ to a perpendicular (dotted line in FIG. 4) and the angle $\alpha$ being in a range of $0° < \alpha < 90°$ and particularly in a range of, for example $30° \leq \alpha \leq 80°$. The first end 18 of the spring element 16 which is accommodated in the recess 42 in the brush element 14 can also be slightly angled or rounded at its end, as shown in FIG. 4, for example in order to provide a greater contact surface on the brush element 14. The end of the first end 18 of the spring element 16 can be angled or rounded corresponding to the bevel 48.

Figure 5:
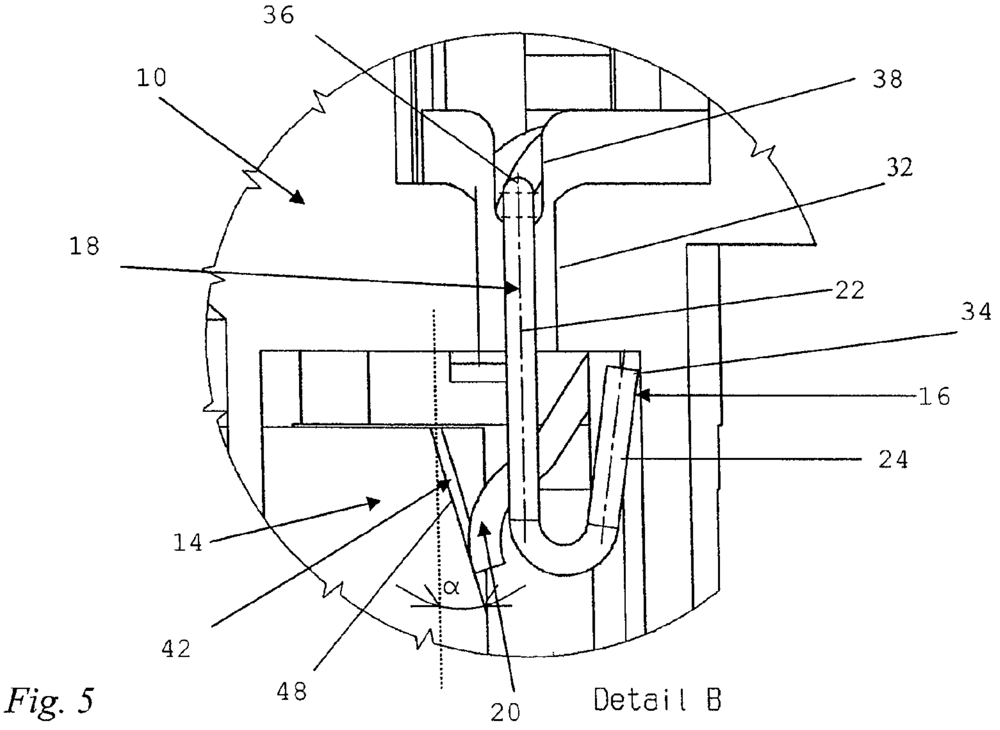
FIG. 5 shows a detail B of the brush holder housing, of the brush and of the brush spring according to FIG. 4.

FIG. 5 shows a detail B of the brush holder housing 10 according to FIG. 4. The detail illustrates the barbed hook 24, hooked into the opening 30 in the brush holder housing 10, of the torsion spring 16. In this respect, the barbed hook 24 can rest against the undercut 28 with its end (not shown) or, as shown in FIG. 3, can be spaced apart from the undercut 28 such that the barbed hook 24 allows a slight movement of the torsion spring 16 in the axial direction in a predetermined region or within a predetermined tolerance range. Furthermore, the detail shows the connection of the second end 20 of the torsion spring 16 to the associated brush element 14. As described previously, the second end 20 of the torsion spring 16 presses the brush element 14 in the direction of the commutator of the electric motor. For this, the brush element 14 has as a seat 42, for example a recess or opening in which the second end 20 is accommodated. The recess or opening 42 can also be provided with a bevel 48, as previously described, the bevel 48 having the angle α to a perpendicular (dotted line in FIG. 4) and the angle α being in a range of $0° < \alpha < 90°$ and particularly in a range of, for example $30° \leq \alpha \leq 80°$.

Figure 6:
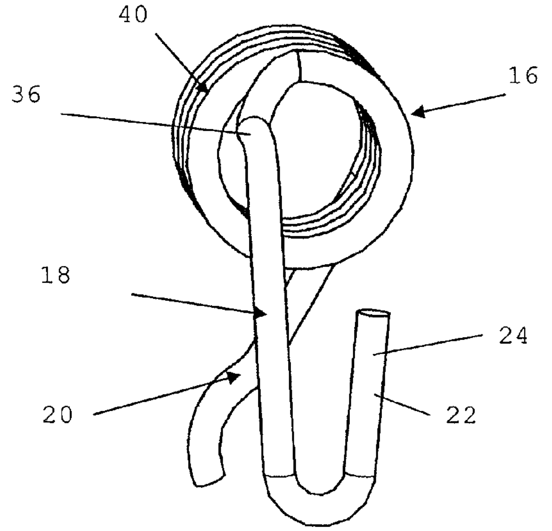
FIG. 6 is a perspective view of the brush spring.

FIGS. 6 to 9 show a torsion spring, as used in FIGS. 1 to 5 as an example of a spring element 16. FIG. 6 is a perspective view of the torsion spring 16 or brush spring. As previously described, the torsion spring 16 has a wound portion 40 with a first end 18 and a second end 20, the first end 18 having a first portion 22 and optionally having a second portion 24. The second portion 22 of the first end 18 extends optionally parallel to the longitudinal axis 50 of the torsion spring 16, as shown in the following FIG. 8, and is introduced into a recess in the brush holder housing to additionally secure the spring element 16 in the radial direction in the brush holder housing. Furthermore, the first end 18 comprises the first portion 22 with a barbed hook 24. The first portion 22 is angled relative to the second portion 36 and extends, for example, vertically or substantially vertically to the longitudinal axis 50 of the torsion spring 16. The barbed hook 24 is configured such that it can be compressed in order to be introduced into the first portion of the opening in the brush holder housing and to then spring apart again in the second opening portion for hooking or catching therein. For this, the barbed hook 24 can be curved round in the shape of a U, for example, as shown in FIG. 3. However, in principle the barbed hook 24 can also be bent in the shape of an L (not shown). The second end 20 of the torsion spring 16 is configured such that it can be pre-tensioned against an associated brush element in order to press against said brush element in a predetermined direction, here in the direction of the commutator of the electric motor. In this respect, the second end 20 can also be angled at its end to rest against the associated brush element.

Figure 7:
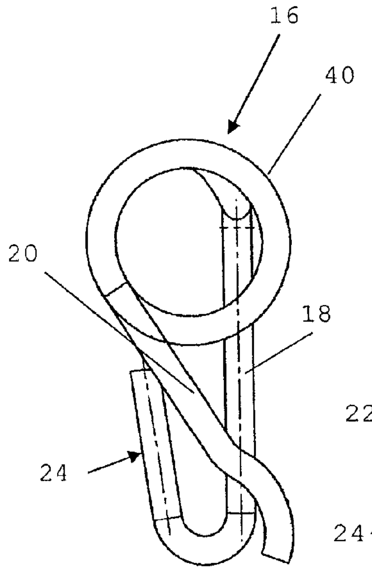
FIG. 7 is a front view of the brush spring according to FIG. 6.

Furthermore, FIG. 7 is a front view of the brush spring or torsion spring 16 according to FIG. 6. This figure illustrates the wound, middle portion 40 of the torsion spring 16 as well as the first and second ends 18, 20 thereof.

Figure 8:
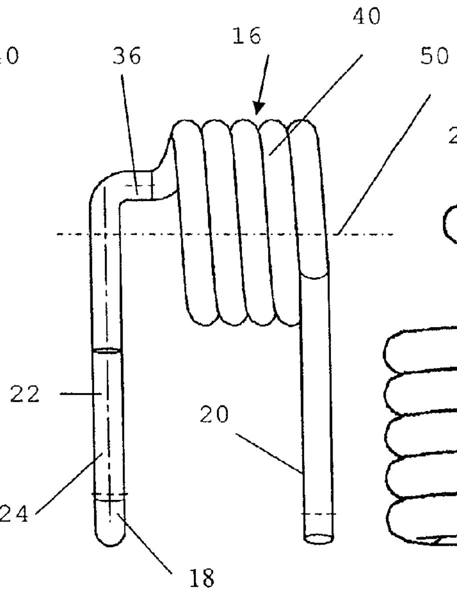
FIG. 8 is a side view of the brush spring according to FIG. 6.

FIG. 8 is a side view of the brush spring or torsion spring 16 according to FIG. 6. As can be seen from FIG. 8, the second portion 36 of the first end 18 is, for example, parallel to the longitudinal axis 50 of the torsion spring 16 or to the wound portion 40 thereof. The first portion 22 of the first end 18 of the torsion spring 16 and the second end 20 of the torsion spring 16 are for example provided vertically to the longitudinal axis 50 of the torsion spring 16.

Figure 9:
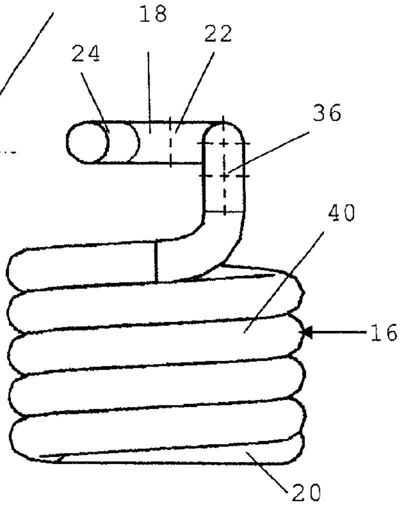
FIG. 9 is a plan view of the brush spring according to FIG. 6.

Finally, FIG. 9 is a plan view of the brush spring or torsion spring 16 according to FIG. 6, the middle or wound portion 40 of the torsion spring 16 being shown, as well as the first and second ends 18, 20 of the torsion spring 16.

The advantage of the embodiments of the invention lies in particular in the saving of space, because only a barbed hook is required, without any additional attachment elements, such as clips or arbors to secure the spring element in the housing. Furthermore, if required for additionally securing the spring element, a snap-in hook can be provided which can be easily configured on the housing, unlike an arbor which is attached laterally to the housing.

Although the present invention has been described above with reference to preferred embodiments, it is not restricted thereto, but can be modified in many different ways.

In particular, the invention is not restricted to the specific configuration of the torsion spring, as illustrated for example in FIGS. 6 to 9. Thus for example, instead of being U-shaped, the barbed hook can also be L-shaped or any other shape suitable for hooking or catching the barbed hook in the brush holder housing to secure the spring element. Furthermore, the first and second portions of the first end of the torsion spring can also have any other orientation or any other angle to one another and to the wound portion of the torsion spring. The same applies accordingly to the second end of the torsion spring. Likewise, the brush holder housing is not restricted to the embodiment illustrated in FIGS. 1 to 5. For example, the brush holder housing according to the invention can be produced from plastics material as an injection moulded part. However, any other material and/or production process is also possible which is suitable for producing a brush holder housing.

LIST OF REFERENCE NUMERALS

10 brush holder housing
12 electric motor arrangement
14 brush element
16 spring element
18 first end (spring element)
20 second end (spring element)
22 first portion (first end of spring element)
24 barbed hook (spring element)
26 seat (for barbed hook in brush holder housing)
28 undercut
30 opening
32 first opening portion
34 second opening portion
36 second portion (second end of spring element)
38 recess (for second portion of spring element)
40 wound portion (spring element)
42 seat (brush element)
44 spring seat (brush holder housing)
46 snap-in hook
48 bevel
50 longitudinal axis (spring element)

The invention claimed is:

1. An electric motor arrangement, comprising:

a brush holder housing having a plurality of brush elements which are coupled with a respective spring element, wherein the spring element is configured to press the respectively associated brush element against a commutator of the electric motor arrangement, and the spring element comprising a first portion with a barbed hook for hooking or catching into a seat in the brush holder housing, wherein the seat in the brush holder housing is configured as an opening with a first opening portion and a second opening portion, permitting the barbed hook to be hooked or caught into the second opening portion, and the first opening portion and the second opening portion forming an undercut, and wherein the brush holder housing comprises a spring seat for accommodating and positioning the spring element in the axial direction, the seat being configured as a recess in the brush holder housing and side walls of the recess being configured to be straight or planar, wherein the brush holder housing has a snap-in hook, said snap-in hook being configured to secure the spring element in the spring seat in the axial direction, and said snap-in hook being arranged on a leading end or on a trailing end of the spring element.

2. The arrangement according to claim 1, wherein the spring element has a first end with the first portion comprising the barbed hook, and a second end which can be coupled with the brush element.

3. The arrangement according to claim 2, wherein the first end of the spring element has a second portion which can be accommodated in a recess in the brush holder housing, the recess being configured to secure the spring element in the radial direction in the brush holder housing, the width of the recess being substantially the same as the thickness of the second portion of the spring element.

4. The arrangement according to claim 2, wherein the barbed hook of the first end of the spring element is U-shaped or L-shaped.

5. The arrangement according to claim 1, wherein a radial width of the first opening portion is configured to be smaller than a radial width of the barbed hook of the spring element such that when the barbed hook passes through the first opening portion, it is compressed.

6. The arrangement according to claim 1, wherein the respective brush element has on its outer side a seat for the second end of the spring element for coupling the brush element with the spring element, the seat being configured in particular as a recess or opening.

7. The arrangement according to claim 6, wherein the seat in the brush element is beveled or has a bevel extending in the direction of the commutator and the second end of the spring element is straight, angled or rounded at its end.

8. The arrangement according to claim 1, wherein the spring element is configured as a torsion spring, said torsion spring comprising a wound middle portion.

9. The arrangement according to claim 1, wherein the brush holder housing is configured as a plastics material injection moulded part.

10. The arrangement according to claim 1, wherein the first opening portion is a slot.

11. An electric motor arrangement, comprising:

a brush holder housing having a plurality of brush elements which are coupled with a respective spring element, wherein the spring element is configured to press the respectively associated brush element against a commutator of the electric motor arrangement, and the spring element comprising a first portion with a barbed hook for hooking or catching into a seat in the brush holder housing, wherein the seat in the brush holder housing is configured as an opening with a first opening portion and a second opening portion, permitting the barbed hook to be hooked or caught into the second opening portion, and the first opening portion and the second opening portion forming an undercut, wherein the spring element has a first end with the first portion comprising the barbed hook, and a second end which can be coupled with the brush element, wherein the first end of the spring element has a second portion which can be accommodated in a recess in the brush holder housing, the recess being configured to secure the spring element in the radial direction in the brush holder housing, the width of the recess being substantially the same as the thickness of the second portion of the spring element.

* * * * *